United States Patent
Su et al.

(10) Patent No.: US 8,131,502 B2
(45) Date of Patent: Mar. 6, 2012

(54) SENSING SYSTEM AND METHOD FOR OBTAINING LOCATION OF POINTER THEREOF

(75) Inventors: Tzung-Min Su, Hsinchu (TW); Cho-Yi Lin, Hsinchu (TW); Hsin-Chia Chen, Hsinchu (TW); Chih-Hsin Lin, Hsinchu (TW); Tzu-Yi Chao, Hsinchu (TW)

(73) Assignee: PixArt Imaging Inc., Hsinchu (TW)

( * ) Notice: Subject to any disclaimer, the term of this patent is extended or adjusted under 35 U.S.C. 154(b) by 296 days.

(21) Appl. No.: 12/550,681

(22) Filed: Aug. 31, 2009

(65) Prior Publication Data

US 2010/0094584 A1 Apr. 15, 2010

Related U.S. Application Data

(63) Continuation-in-part of application No. 12/249,222, filed on Oct. 10, 2008, now Pat. No. 7,689,381.

(30) Foreign Application Priority Data

Feb. 11, 2009 (TW) .............................. 98104392 A

(51) Int. Cl.
*G06F 15/00* (2006.01)
*G06F 3/033* (2006.01)
(52) U.S. Cl. ........................................ 702/151; 345/157
(58) Field of Classification Search .......... 702/150–152; 345/157, 173, 174; 178/18.09
See application file for complete search history.

(56) References Cited

U.S. PATENT DOCUMENTS

| | | | |
|---|---|---|---|
| 4,507,557 A | 3/1985 | Tsikos | |
| 4,782,328 A | 11/1988 | Denlinger | |
| 6,036,189 A | 3/2000 | Gomez et al. | |
| 6,803,906 B1 | 10/2004 | Morrison et al. | |
| 7,109,978 B2 * | 9/2006 | Gillespie et al. | 345/173 |
| 7,692,625 B2 | 4/2010 | Morrison et al. | |
| 7,755,026 B2 | 7/2010 | Pittel et al. | |
| 7,907,124 B2 | 3/2011 | Hillis et al. | |
| 7,924,272 B2 | 4/2011 | Boer et al. | |
| 2005/0243070 A1 | 11/2005 | Ung et al. | |
| 2009/0090569 A1 | 4/2009 | Lin | |

FOREIGN PATENT DOCUMENTS

| | | |
|---|---|---|
| JP | 1984211128 A | 11/1984 |
| JP | 20051025415 A | 1/2005 |
| WO | 2005034027 A1 | 4/2005 |

* cited by examiner

*Primary Examiner* — Bryan Bui
(74) *Attorney, Agent, or Firm* — Chun-Ming Shih

(57) ABSTRACT

In a sensing system and a method for obtaining a location of a pointer, the sensing system includes a sensing area, a reflective mirror, a first image sensor and a second image sensor. The reflective mirror is configured for generating a mirror image of the sensing area. The sensing system utilizes the above two image sensors to sense the pointer disposed in the sensing area and a mirror image of the pointer for obtaining two coordinate values. And then the sensing system endues each of the two coordinate values with a weighting factor for calculating the location of the pointer.

57 Claims, 14 Drawing Sheets

SENSING SYSTEM AND METHOD FOR OBTAINING LOCATION OF POINTER THEREOF

This application is a continuation-in-part of U.S. application Ser. No. 12/249,222, filed on Oct. 10, 2008 now U.S. Pat. No. 7,689,381, and this application claims the benefit of Taiwan application Ser. No. 098104392, filed on Feb. 11, 2009.

BACKGROUND

1. Field of the Invention

The present invention relates to the touch technology and, more particularly, to a sensing system and a method for obtaining a location of a pointer thereof.

2. Description of the Related Art

FIG. 1 is a tridimensional view of a conventional sensing system. Referring to FIG. 1, the sensing system 100 is used for sensing a location of a pointer 102. The sensing system 100 includes a reflective mirror 104, light-reflecting elements 106 and 108, an image sensor 110 and a processor 112. The reflective mirror 104, the image sensor 110 and the light-reflecting components 106 and 108 are all disposed on a plane 114. The plane 114 may be a whiteboard. Furthermore, a rectangular area indicated by a label 116 is used as a sensing area of the sensing system 100.

The light-reflecting elements 106 and 108 are both configured for reflecting light to the sensing area 116, and the reflective mirror 104 is configured for generating a mirror image of the sensing area 116. The reflective mirror 104 may be a plane mirror having a mirror surface 118, and the mirror surface 118 faces the sensing area 116. The image sensor 110 is disposed at a corner of the sensing area 116, and has a sensing range covering all of the sensing area 116. The processor 112 is electrically coupled to the image sensor 110 for calculating the location of the point 102 according to an image sensed by the image sensor 110.

FIG. 2 is a schematic view for describing a sensing operation of the sensing system 100. As shown in FIG. 2, a portion below a broken line 202 briefly illustrates a part of the sensing system 100 which can be mirrored by the mirror surface 118; and a portion above the broken line 202 is a mirror image of the part of the sensing system 100, which is generated by the mirror surface 118 mirroring the part of the sensing system 100. In FIG. 2, an object indicated by a label 106' is a mirror image of the light-reflecting element 106, an object indicated by a label 108' is a mirror image of the light-reflecting element 108, an object indicated by a label 110' is a mirror image of the image sensor 110, an area indicated by a label 116' is a mirror image of the sensing area 116, and an object indicated by a label 102' is a mirror image of the pointer 102. Thus the image sensor 110 can sense the pointer 102 along a sensing path 204, and also can sense the mirror image 102' of the pointer 102 along a sensing path 206.

FIG. 3 is a schematic view of the image sensed by the image sensor 110 as shown in FIG. 2. In FIG. 3, a label 300 represents an image-sensing window of the image sensor 110. An oblique-line area indicated by a label 302 is a bright zone with a high luminance formed on the image by the light reflected by the light-reflecting element 106 and the reflective mirror 104. The bright zone 302 is a primary sensing zone. A label 304 represents an obscure line caused by the pointer 102, and a label 306 represents an obscure line caused by the mirror image 102' of the pointer 102. Therefore, the processor 112 can further calculate the location of the pointer 102 according to locations of the obscure lines 304 and 306 in the image-sensing window 300. A relevant calculating method is disclosed in a Taiwan patent application numbered 097126033.

However, the sensing system 100 has a disadvantage, which will be described in FIG. 4. FIG. 4 illustrates another sensing operation of the sensing system 100. As shown in FIG. 4, when the pointer 102 approaches a boundary 192 of the sensing area 116, although the image sensor 110 is still able to sense the pointer 102 along a sensing path 402 and to sense the mirror image 102' of the pointer 102 along a sensing path 404, the image sensed by the image sensor 110 may only have a single obscure line appeared therein. This resulted from that the sensing paths 402 and 404 are too close, which will be described in FIG. 5.

FIG. 5 is a schematic view of the image sensed by the image sensor 110 as shown in FIG. 4. As shown in FIG. 5, the obscure line indicated by a label 502 cannot be judged to be the obscure line caused by the pointer 102 or the obscure line caused by the mirror image 102' of the pointer 102. Thus the location of the pointer 102 calculated by the sensing system 100 may be an error. Furthermore, the sensing system 100 even cannot calculate the location of the pointer 102.

BRIEF SUMMARY

The present invention relates to a sensing system, which can calculate a location of a pointer and can accurately calculate the location of the pointer no matter where the pointer is located in a sensing area of the sensing system.

The present invention also relates to a method for obtaining a location of a pointer, which is adapted for the sensing system.

A sensing system in accordance with an exemplary embodiment of the present invention comprises a sensing area, a reflective mirror, a first image sensor, a second image sensor and a processor. The reflective mirror is configured for generating a mirror image of the sensing area. The first image sensor and the second image sensor are both configured for sensing images of the sensing area, and at least one of the first image sensor and the second image sensor has a sensing range covering all of the sensing area. When a pointer approaches or contacts with the sensing area, the processor calculates a first coordinate value of the pointer according to the pointer and a mirror image of the pointer which are sensed by the first image sensor and endues the first coordinate value with a first weighting factor. Furthermore, the processor also calculates a second coordinate value of the pointer according to the pointer and the mirror image of the pointer which are sensed by the second image sensor and endues the second coordinate value with a second weighting factor, such that the processor could calculate the location of the pointer according to the first coordinate value, the first weighting factor, the second coordinate value and the second weighting factor.

A sensing system in accordance with another exemplary embodiment of the present invention comprises a sensing area, a reflective mirror, a first image sensor, a second image sensor, a first processor and a second processor. The reflective mirror is configured for generating a mirror image of the sensing area. The first image sensor and the second image sensor are both configured for sensing images of the sensing area, and at least one of the first image sensor and the second image sensor has a sensing range covering all of the sensing area. When a pointer approaches or contacts with the sensing area, the first processor calculates a first coordinate value of the pointer according to the pointer and a mirror image of the pointer which are sensed by the first image sensor and endues the first coordinate value with a first weighting factor. The second processor receives the first coordinate value and the first weighting factor, and determines whether to employ the second image sensor to sense the pointer and the mirror image of the pointer according to the first weighting factor for calculating the location of the pointer.

A method for obtaining a location of a pointer in accordance with an exemplary embodiment of the present invention is adapted for a sensing system. The sensing system comprises a sensing area, a reflective mirror, a first image sensor and a second image sensor. The reflective mirror is configured for generating a mirror image of the sensing area. The first image sensor and the second image sensor are both configured for sensing images of the sensing area, and at least one of the first image sensor and the second image sensor has a sensing range covering all of the sensing area. The method comprises following steps: firstly, calculating a first coordinate value of the pointer according to the pointer and a mirror image of the pointer which are sensed by the first image sensor and enduing the first coordinate value with a first weighting factor; calculating a second coordinate value of the pointer according to the pointer and the mirror image of the pointer which are sensed by the second image sensor and enduing the second coordinate value with a second weighting factor; next, calculating the location of the pointer according to the first coordinate value, the first weighting factor, the second coordinate value and the second weighting factor.

A method for obtaining a location of a pointer in accordance with another exemplary embodiment is adapted for a sensing system. The sensing system comprises a sensing area, a reflective mirror, a first image sensor and a second image sensor. The reflective mirror is configured for generating a mirror image of the sensing area. The first image sensor and the second image sensor are both configured for sensing images of the sensing area, and at least one of the first image sensor and the second image sensor has a sensing range covering all of the sensing area. The method comprises following steps: firstly, calculating a first coordinate value of the pointer according to the pointer and a mirror image of the pointer which are sensed by the first image sensor and enduing the first coordinate value with a first weighting factor; next, determining whether to employ the second image sensor to sense the pointer and the mirror image of the pointer according to the first weighting factor for calculating the location of the pointer.

In an exemplary embodiment of the present invention, the steps of generating the first weighting factor in the present invention comprises to regard the sensing area as a first area, to divide the first area into a plurality of sub-areas to endue each of the sub-areas with a weighting factor in relation to the first image sensor, to designate a weighting factor of a sub-area of the first area where the pointer is located as the first weighting factor after calculating the first coordinate value. In addition, the steps of generating the second weighting factor in the present invention comprises to regard the sensing area as a second area, to divide the second area into a plurality of sub-areas to endue each of the sub-areas with a weighting factor in relation to the second image sensor, to designate a weighting factor of a sub-area of the second area where the pointer is located as the second weighting factor after calculating the second coordinate value.

In the present invention, the first image sensor and the second image sensor are disposed at two different corners of the sensing area respectively, and the images obtained by the first image sensor and the second image sensor are utilized to calculate two coordinate values of the pointer. After obtaining the two coordinate values, the two coordinate values are endued with two different weighting factors respectively in relation to the disposed locations of the image sensors, so as to evaluate important degrees (that is accurate degrees) of the two coordinate values. Therefore, if properly enduing with the weighting factors, the location of the pointer can be calculated and can be accurately calculated no matter where the pointer is disposed in the sensing area. Furthermore, in the present invention an image obtained by an image sensor could be utilized to calculate a coordinate value of the pointer firstly, and then the coordinate value is endued with a weighting factor in relation to the disposed location of the image sensor, so as to evaluate an important degree (that is an accurate degree) of the coordinate value for determining whether to employ another image sensor to obtain another image, such that another coordinate value with a more accurate degree can be calculated. Similarly, if properly enduing with the weighting factor, the location of the pointer can be calculated and can be accurately calculated no matter where the pointer is disposed in the sensing area.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present sensing system and the present method for obtaining a location of a pointer, in detail. The following description is given by way of example, and not limitation.

Figure 6:
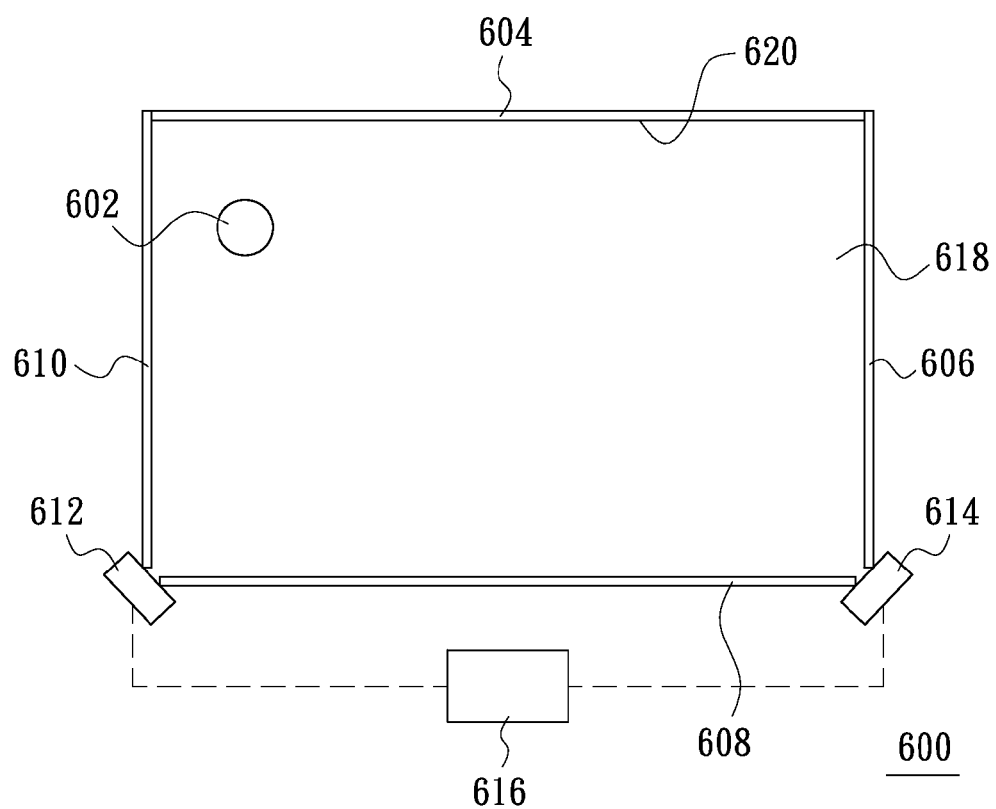
FIG. 6 is a schematic view of a sensing system in accordance with an exemplary embodiment of the present invention.

FIG. 6 is a schematic view of a sensing system in accordance with an exemplary embodiment of the present invention. Referring to FIG. 6, the sensing system 600 is used for sensing a location of a pointer 602. The sensing system 600 includes light-emitting elements 606, 608 and 610, image sensors 612 and 614, a processor 616 and a reflective mirror 604. In this exemplary embodiment, the reflective mirror 604, the light-emitting elements 606, 608 and 610, and the image sensors 612 and 614 are all disposed on a same plane (not shown), such as a surface of a whiteboard.

Figure 7:
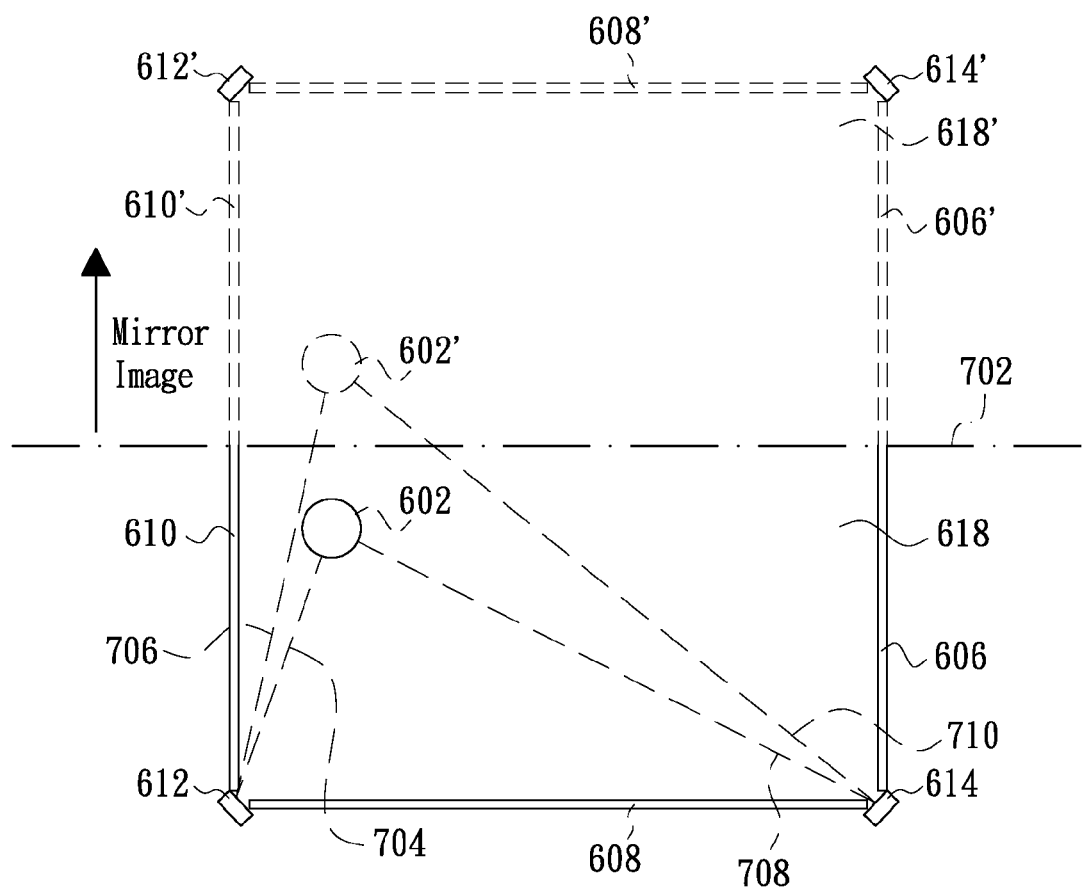
FIG. 7 is a schematic view for describing a sensing operation of the sensing system 600.

In FIG. 6, an area indicated by a label 618 presents a quadrangular shape, and the area is used as a sensing area of the sensing system 600. In this exemplary embodiment, the sensing area 618 is rectangular. The above light-emitting elements 606, 608 and 610 are all configured for emitting light towards the sensing area 618, and the reflective mirror 604 is configured for generating a mirror image of the sensing area 618. The reflective mirror 604 may be a plane mirror having a mirror surface 620, and the mirror surface 620 faces the sensing area 618. A preferable configuration of the reflective mirror 604 is enabling the mirror surface 620 thereof and the above plane being perpendicular to one another. The image sensors 612 and 614 are disposed at two different corners of the sensing area 618, and the sensing ranges of the two image sensors cover all of the sensing area 618 respectively. The processor 616 is electrically coupled to the image sensors 612 and 614 for calculating the location of the pointer 602 according to images obtained by the two image sensors. FIG. 7 will describe in detail.

FIG. 7 is a schematic view for describing a sensing operation of the sensing system 600. As shown in FIG. 7, a portion below a broken line 702 briefly illustrates a part of the sensing system 600 which can be mirrored by the mirror surface 620; a portion above the broken line 702 illustrates a mirror image of the above part of the sensing system 600, which is generated by the mirror surface 620 mirroring the above part of the sensing system 600. In FIG. 7, an object indicated by a label 606' is a mirror image of the light-emitting element 606, an object indicated by a label 608' is a mirror image of the light-emitting element 608, an object indicated by a label 610' is a mirror image of the light-emitting element 610, an object indicated by a label 612' is a mirror image of the image sensor 612, an object indicated by a label 614' is a mirror image of the image sensor 614, an area indicated by a label 618' is a mirror image of the sensing area 618, and an object indicated by a label 602' is a mirror image of the pointer 602. Therefore, the image sensor 612 can sense the pointer 602 along a sensing path 704, and also can sense the mirror image 602' of the pointer 602 along a sensing path 706. Similarly, the image sensor 614 can sense the pointer 602 along a sensing path 708, and also can sense the mirror image 602' of the pointer 602 along a sensing path 710.

Therefore, the processor 616 can calculate a first coordinate value of the pointer 602 according to the pointer 602 and the mirror image 602' of the pointer 602 which are sensed by the image sensor 612. In detail, the pointer 602 and the mirror image 602' thereof enable the image sensor 612 to form obscure lines in an image sensing window of the image sensor 612, and the processor 616 can calculate the first coordinate value of the pointer 602 according to the obscure lines caused by the pointer 602 and the mirror image 602' thereof. After calculating the above first coordinate value, the processor 616 will endue the first coordinate value with a first weighting factor in relation to the disposed location of the image sensor 612, so as to evaluate an important degree (that is an accurate degree) of the first coordinate value. A method for enduing with the first weight factor will be described in FIG. 8.

Figure 8:
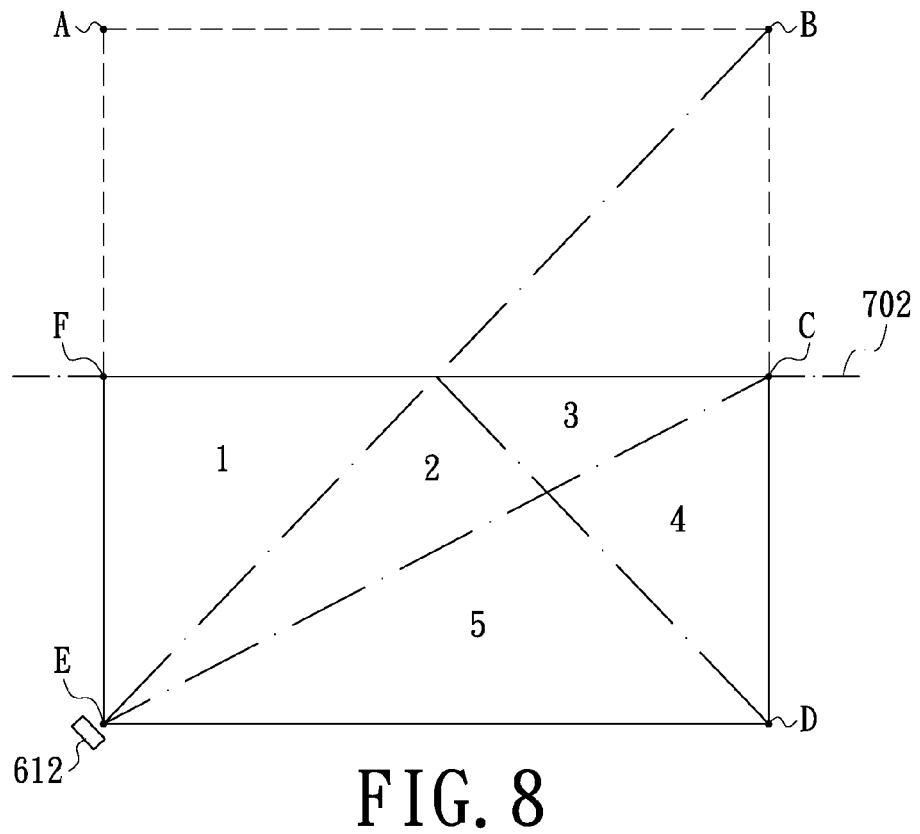
FIG. 8 illustrates a method for enduing with a first weight factor.

FIG. 8 illustrates a method for enduing with the first weight factor. In FIG. 8, a rectangular area surrounded by lines $\overline{FC}$, $\overline{CD}$, $\overline{DE}$ and $\overline{EF}$ below the broken line 702 is the sensing area 618, and a rectangular area surrounded by lines $\overline{AB}$, $\overline{BC}$, $\overline{CF}$ and $\overline{FA}$ above the broken line 702 is the mirror image 618' of the sensing area 618. In this exemplary embodiment, the processor 616 regards the sensing area 618 as a first area and divides the first area into five sub-areas indicated by labels 1~5 in relation to the image sensor 612. As shown in FIG. 8, if the pointer 602 is located in the sub-area 1, the two sensing paths of the image sensor 612 sensing the pointer 602 and the mirror image 602' thereof can be extend to intersect with the line $\overline{AB}$ of the mirror image 618' of the sensing area 618. If the pointer 602 is located in the sub-area 2, the two sensing paths of the image sensor 612 sensing the pointer 602 and the mirror image 602' thereof can be extend to intersect with the lines $\overline{BC}$ and $\overline{AB}$ of the mirror image 618' of the sensing area 618 respectively. For the sub-areas 3~5, it can make an analogy from the above, and does not describe in following.

The processor 616 will endue each of the above sub-areas with a weighting factor, and the weighting factors of the sub-areas are different from each other. From the location of the pointer 602 as shown in FIG. 7, the pointer 602 is located in the sub-area 1 of the first area, such that the processor 616 will regard the weighting factor of the sub-area 1 as the above first weighting factor. Since it may be most probable to enabling the image sensed by the image sensor 612 to only have a single obscure line when the pointer 602 is located in the sub-area 1, the weighting factor of the sub-area 1 should be least compared with the weighting factors of the other four sub-areas of the first area.

Referring to FIG. 7 again, similarly, the processor 616 can calculate a second coordinate value of the pointer 602 according to the pointer 602 and the mirror image 602' of the pointer 602 which are sensed by the image sensor 614. After calculating the second coordinate value, the processor 616 will endue the second coordinate value with a second weighting factor in relation to the disposed location of the image sensor 614, so as to evaluate an important degree (that is an accurate degree) of the second coordinate value. A method for enduing with the second coordinate value will be described in FIG. 9.

Figure 9:
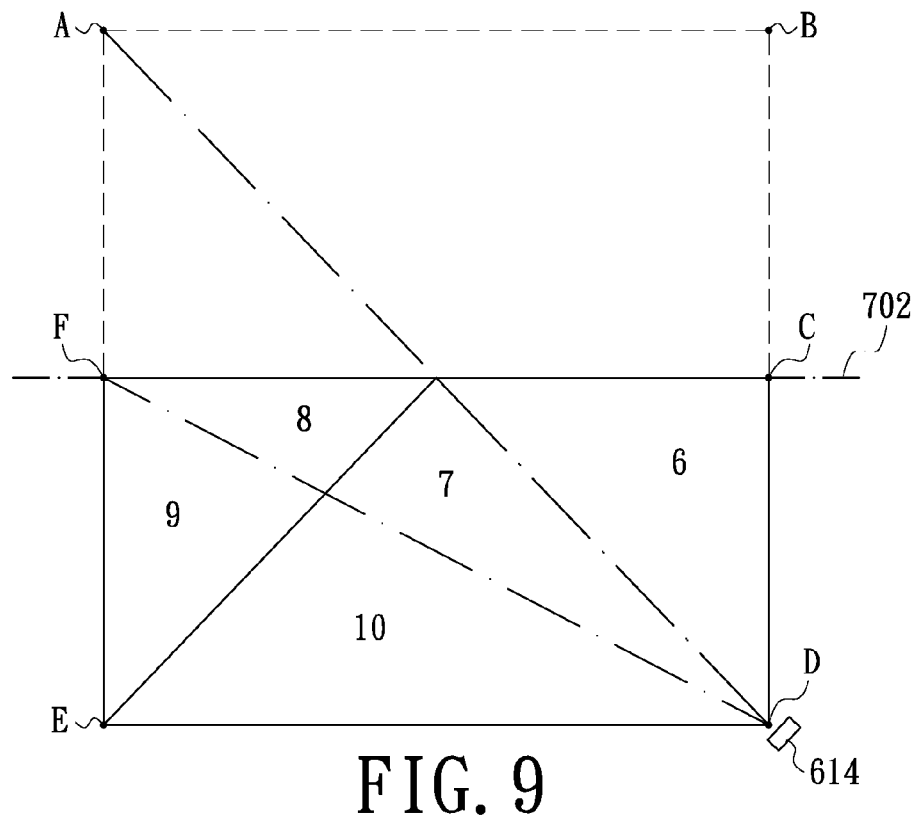
FIG. 9 illustrates a method for enduing with a second weight factor.

FIG. 9 illustrates a method for enduing with the second coordinate value. In FIG. 9, the rectangular area surrounded by the lines $\overline{FC}$, $\overline{CD}$, $\overline{DE}$ and $\overline{EF}$ below the broken line 702 is the sensing area 618, and the rectangular area surrounded by $\overline{AB}$, $\overline{BC}$, $\overline{CF}$ and $\overline{FA}$ above the broken line 702 is the mirror image 618' of the sensing area 618. In this exemplary embodiment, the processor 616 will regard the sensing area 618 as a second area and divides the second area into five sub-areas indicated by labels 6~10 in relation to the image sensor 614. From FIG. 9, the five sub-areas of the second area are symmetric with the five sub-areas of the first area.

Similarly, the processor 616 will endue each of the five sub-areas of the second area with a weighting factor, and the weighting factors of the five sub-areas are different from each other. In this exemplary embodiment, the weighting factors of the sub-areas 6~10 are same to those of the sub-areas 1~5 respectively. From the location of the pointer 602 as shown in FIG. 7, the pointer 602 is located in the sub-area 9 of the second area, such that the processor 616 will regard the weighting factor of the sub-area 9 as the second weighting factor. From the above description, the second weighting factor is larger than the first weighting factor in this exemplary embodiment.

Next, the processor 616 will calculate the location of the pointer 602 by the following formula (1):

$$P = W_1 P_1 + W_2 P_2 \qquad (1),$$

wherein P is the location of the pointer, $W_1$ is the first weighting factor, $P_1$ is the first coordinate value, $W_2$ is the second weighting factor, and $P_2$ is the second coordinate value. Certainly, the processor 616 also can calculate the location of the pointer 602 by a weighted average method as shown in the following formula (2):

$$P = (W_1 P_1 + W_2 P_2)/(W_1 + W_2) \qquad (2).$$

In this exemplary embodiment, since the second weighting factor is larger than the first weighting factor, the first weighting factor will decrease the importance degree of the first coordinate value, and the second weighting factor will increase the importance degree of the second coordinate value, thus the location of the pointer 602 can be accurately calculated.

Figure 1:
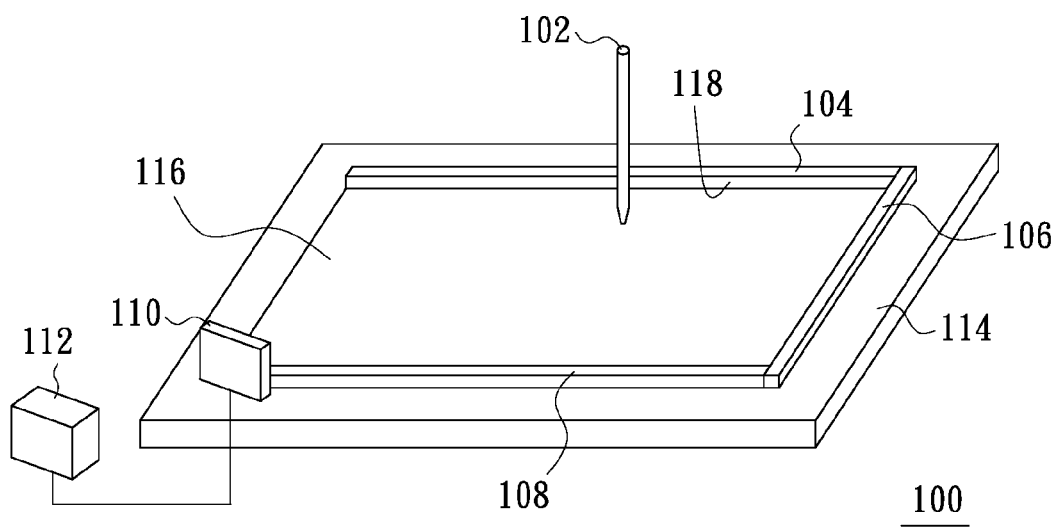
FIG. 1 is a tridimensional view of a conventional sensing system.
Figure 2:
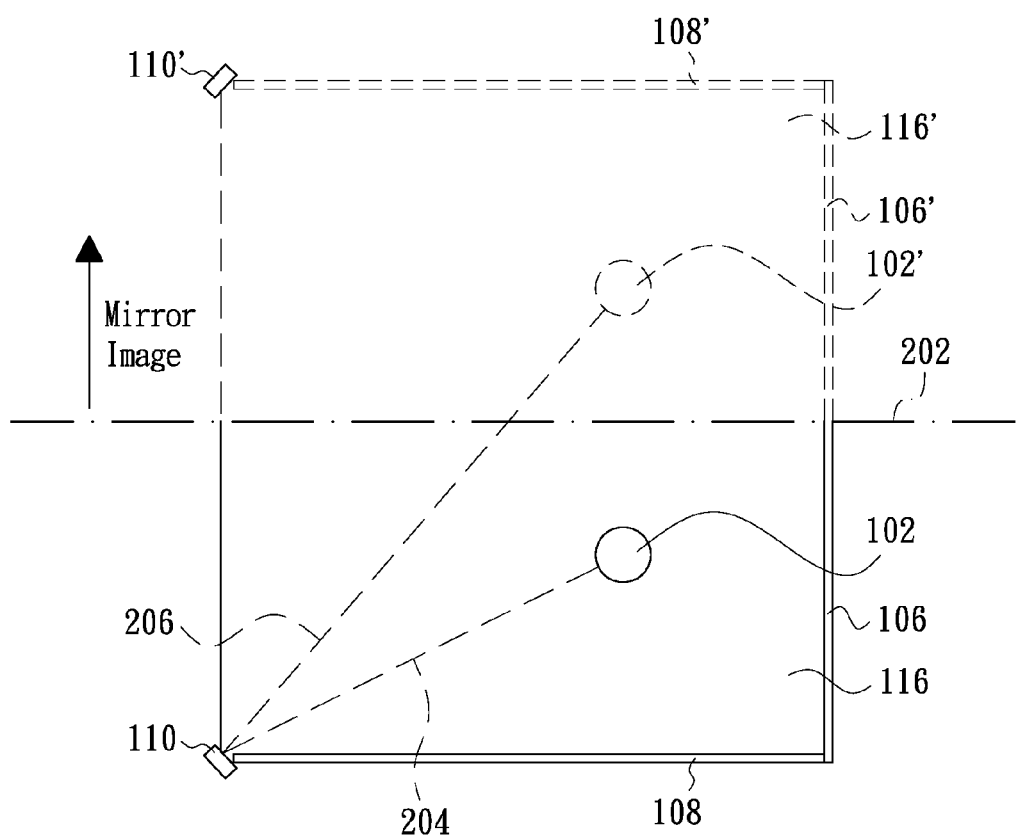
FIG. 2 is a schematic view for describing a sensing operation of the sensing system 100.
Figure 3:
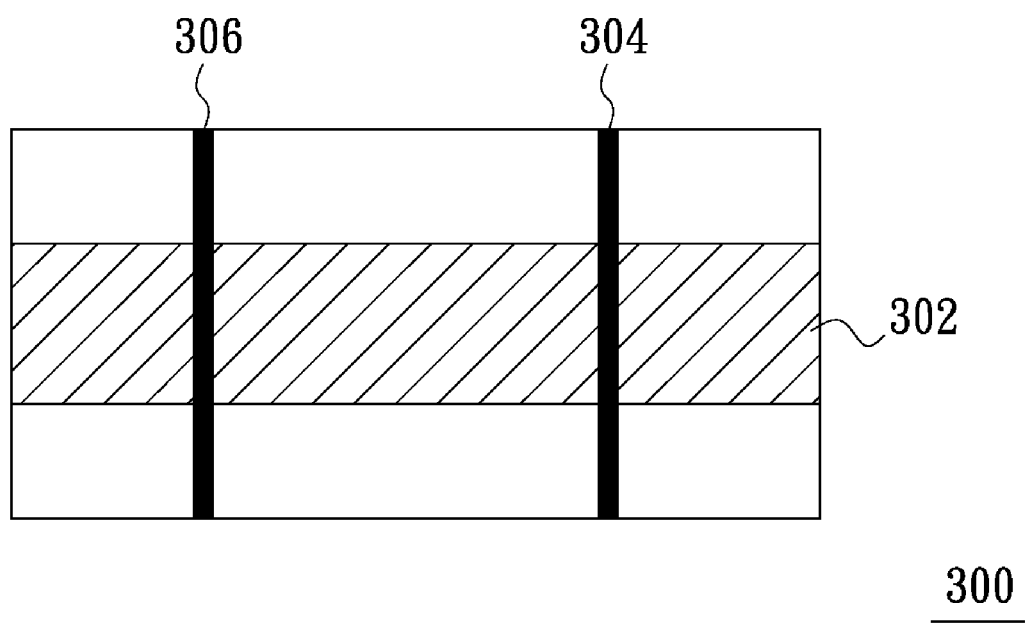
FIG. 3 is a schematic view of an image sensed by an image sensor 110 as shown in FIG. 2.
Figure 4:
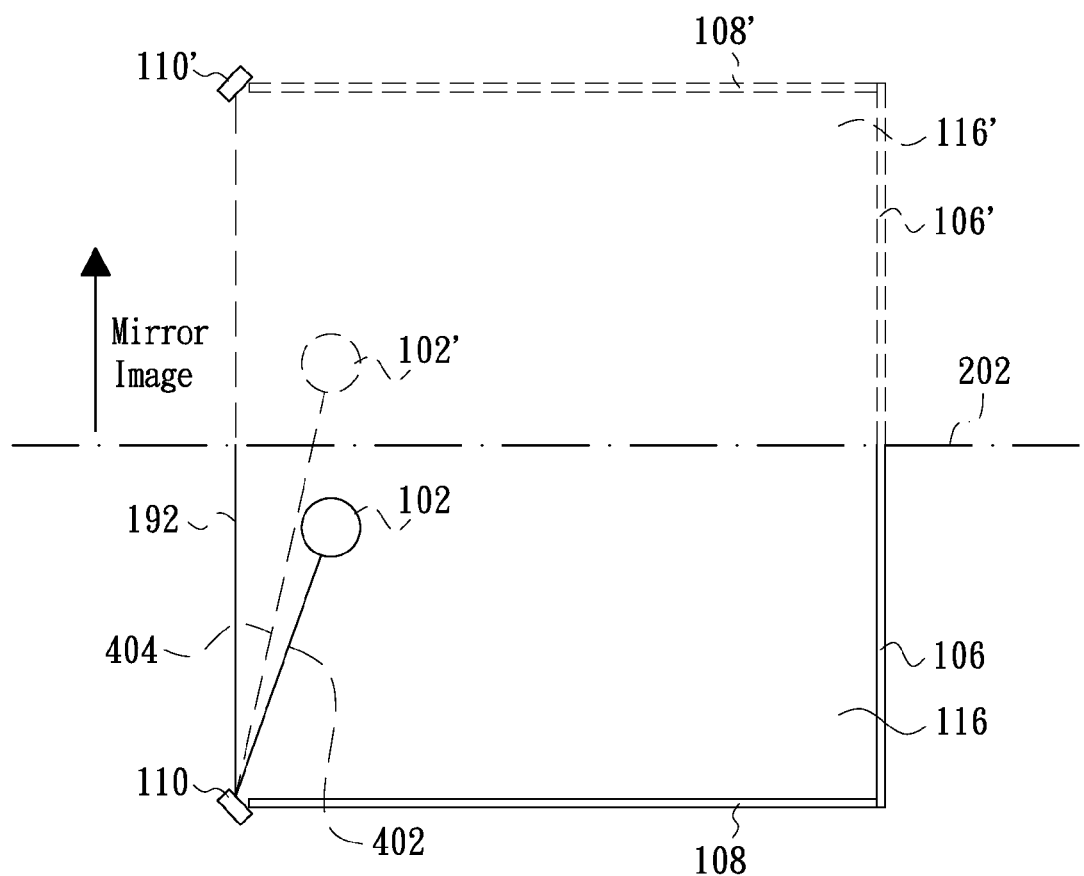
FIG. 4 is a schematic view for describing another sensing operation of the sensing system 100.
Figure 5:
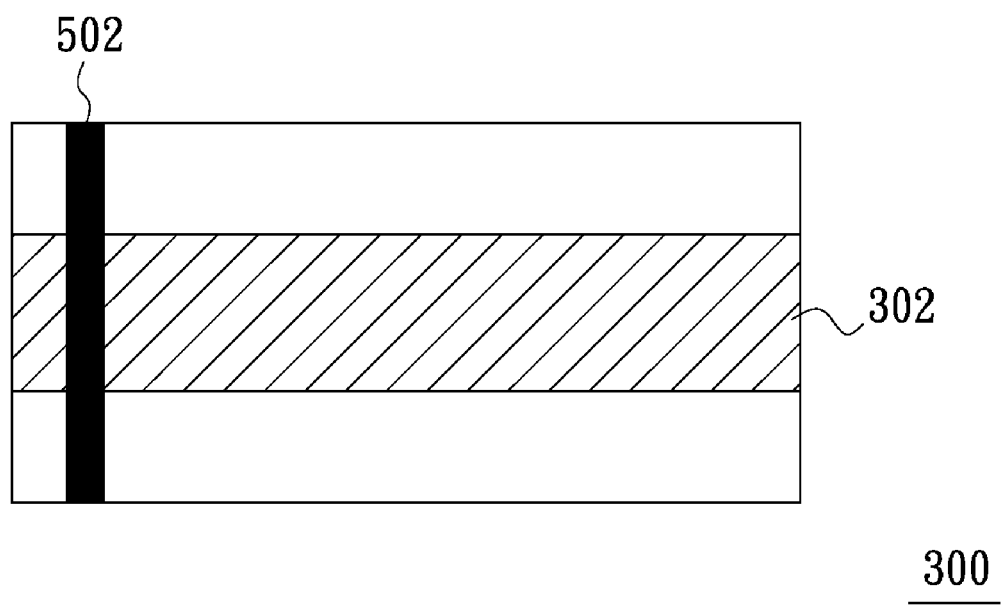
FIG. 5 is a schematic view of an image sensed by an image sensor 110 as shown in FIG. 4.

From the above description, it can be seen that the present sensing system 600 can distribute the weighting factors to calculate the location of the pointer compared with the sensing system 100 as shown in FIG. 1. Therefore, if the sensing system 600 is able to properly distribute the weighting factors, the sensing system 600 can calculate the location of the pointer and can accurately calculate the location of the pointer no matter where the pointer is located.

Figure 10:
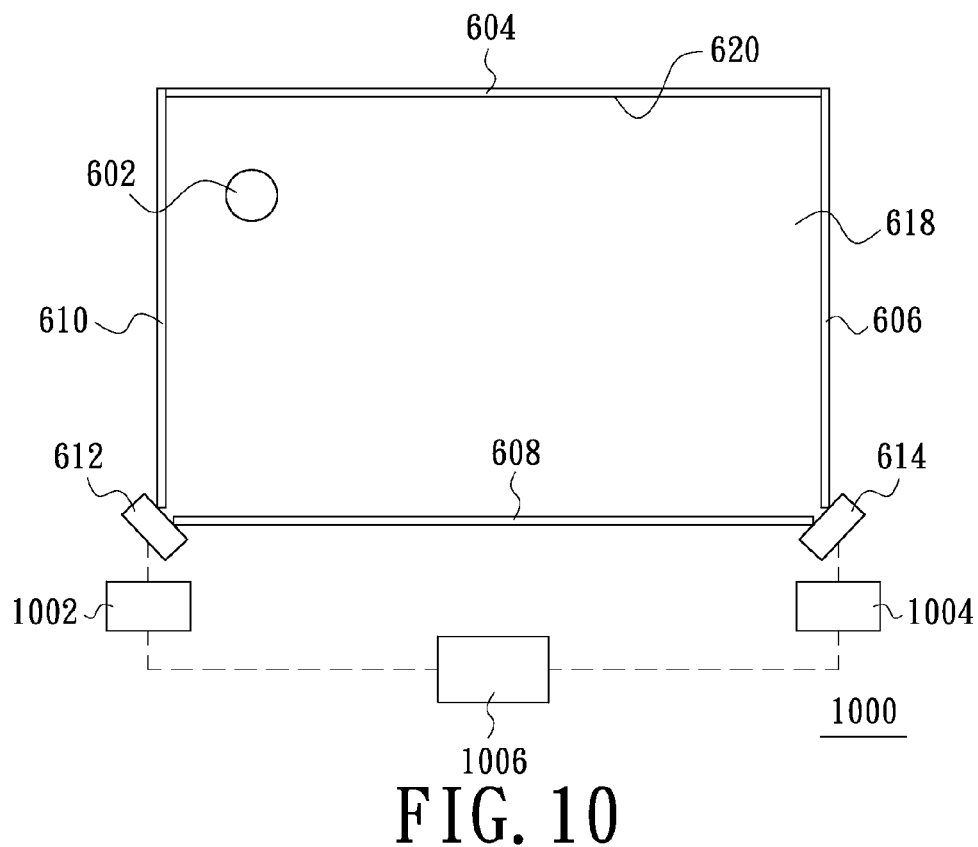
FIG. 10 is a schematic view of a sensing system in accordance with another exemplary embodiment of the present invention.

FIG. 10 is a schematic view of a sensing system in accordance with another exemplary embodiment of the present invention. Referring to FIGS. 10 and 6, the sensing system 1000 as shown in FIG. 10 is similar with the sensing system 600 as shown in FIG. 6, except that the processor of the sensing system 1000 is composed of sub-processors 1002, 1004 and 1006. As shown in FIG. 10, the sub-processors 1002 and 1004 are electrically coupled to the image sensors 612 and 614 respectively, and the sub-processor 1006 is electrically coupled to the sub-processors 1002 and 1004. The sub-processor 1002 is configured for calculating a first coordinate value according to the pointer 602 and the mirror image of the pointer 602 which are sensed by the image sensor 612 and enduing the first coordinate value with a first weighting factor. The sub-processor 1004 is configured for calculating a second coordinate value according to the pointer 602 and the mirror image of the pointer 602 which are sensed by the image sensor 614 and enduing the second coordinate value with a second weighting factor. The sub-processor 1006 is configured for calculating the location of the pointer 602 according to the first coordinate value, the first weighting factor, the second coordinate value and the second weighting factor.

In the sub-processors 1002 and 1004, the sub-processor 1002 regards the sensing area 618 as a first area and divides the first area into a plurality of sub-areas to endue each of the sub-areas with a weighting factor in relation to the image sensor 612. After the sub-processor 1002 calculates the first coordinate value, the sub-processor 1002 designates a weighting factor of a sub-area of the first area where the pointer 602 is located as the first weighting factor. The sub-processor 1004 regards the sensing area 618 as a second area and divides the second area into a plurality of sub-areas to endue each of the sub-areas with a weighting factor in relation to the image sensor 614. After the sub-processor 1004 calculates the second coordinate value, the sub-processor 1004 designates a weighting factor of a sub-area of the second area where the pointer 602 is located as the second weighting factor.

Figure 11:
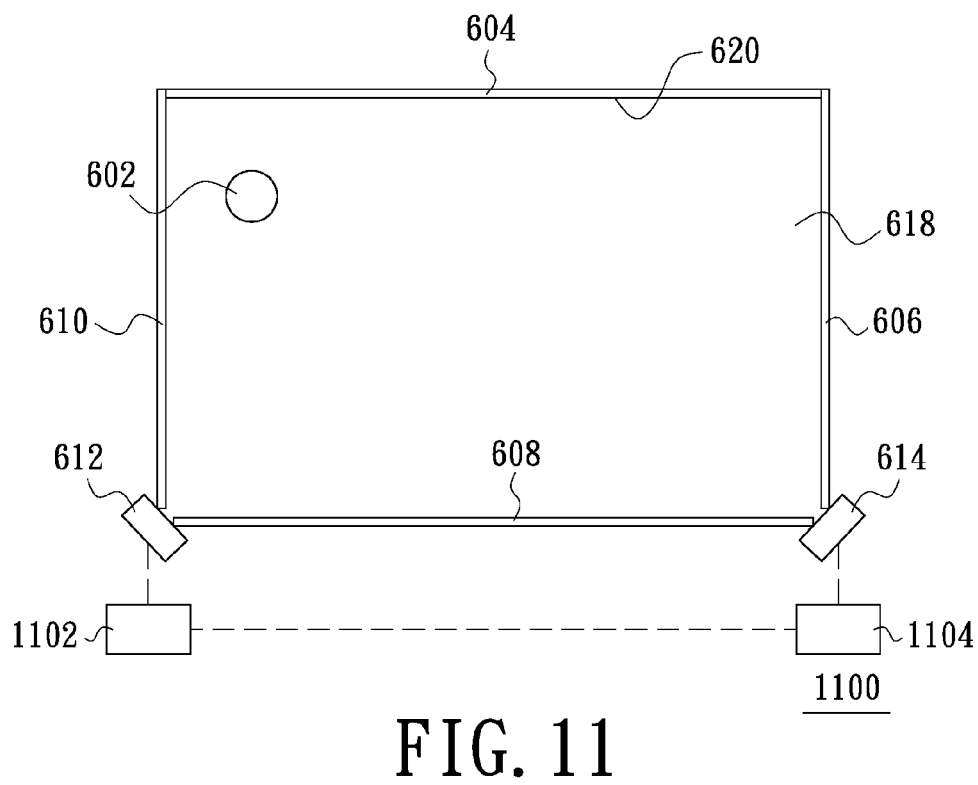
FIG. 11 is a schematic view of a sensing system in accordance with still another exemplary embodiment of the present invention.

FIG. 11 is a schematic view of a sensing system in accordance with still another exemplary embodiment of the present invention. Referring to FIGS. 11 and 6, the sensing system 1100 as shown in FIG. 11 is similar with the sensing system 600 as shown in FIG. 6, except that the sensing system 1100 employs processors 1102 and 1104 to replace the processor 616 of the sensing system 600. As shown in FIG. 11, the processors 1102 and 1104 are electrically coupled to the image sensors 612 and 614 respectively, and the processors 1102 and 1104 are electrically coupled with each other. An operating method of the sensing system 1100 will be described in FIG. 12.

Figure 12:
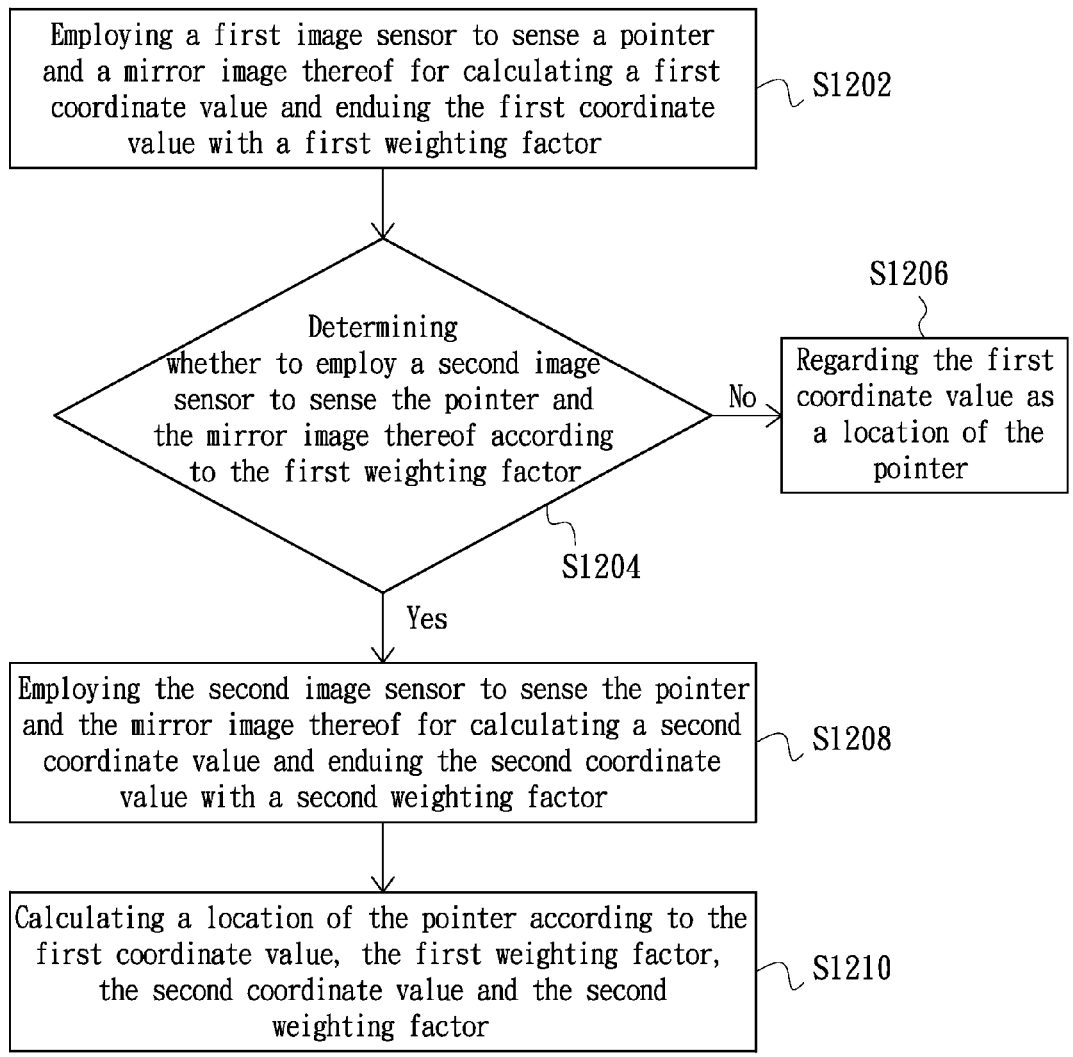
FIG. 12 is an operating flow chart of the sensing system 1100.

FIG. 12 is an operating flow chart of the sensing system 1100. Refer to FIGS. 11 and 12. Firstly, the processor 1102 employs the image sensor 612 to sense the pointer 602 and the mirror image thereof, so as to calculate the first coordinate value of the pointer 602 according to the pointer 602 and the mirror image of the pointer 602 which are sensed by the image sensor 612 and to endue the first coordinate value with a first weighting factor (as shown in a step S1202). Next, the processor 1104 will receive the first coordinate value and the first weighting factor, and determine whether to employ the image sensor 614 to sense the pointer 602 and the mirror image thereof according to the first weighting factor (as shown in a step S1204).

When the processor 1104 determines not to employ the image sensor 614, the processor 1104 will directly regard the first coordinate value as the location of the pointer 602 (as shown in a step S1206). When the processor 1104 determines to employ the image sensor 614, the processor 1104 employs the image sensor 614 to sense the pointer 602 and the mirror image thereof, so as to calculate a second coordinate value of the pointer 602 according to the pointer 602 and the mirror image of the pointer 602 which are sensed by the image sensor 614 and to endue the second coordinate value with a second weighting factor (as shown in a step S1208). Afterward, the processor 1104 will calculate the location of the pointer 602 according to the first coordinate value, the first weighting factor, the second coordinate value and the second weighting factor (as shown in a step S1210), such as calculating by the formula (1) or the formula (2). Certainly, in the step S1210, the processor 1104 may directly regard the second coordinate value as the location of the pointer 602 instead of calculating the location of the pointer 602 according to the first coordinate value, the first weighting value, the second coordinate value and the second weighting value.

Figure 13:
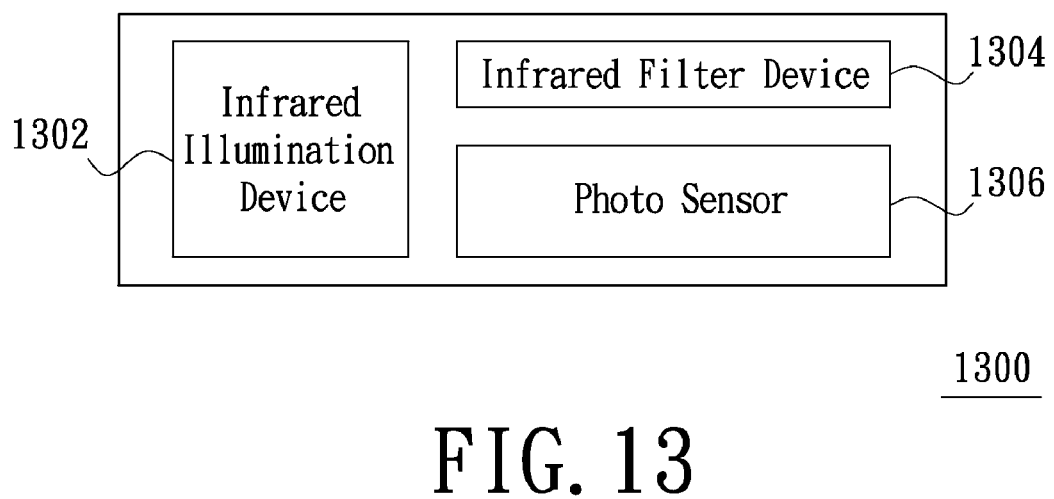
FIG. 13 illustrates a structure of an image sensor adapted for the sensing system.

FIG. 13 illustrates a structure of an image sensor adapted for the above sensing systems. Referring to FIG. 13, the image sensor 1300 includes an infrared (IR) illumination device 1302, an IR filter device 1304 configured for only allowing IR light to pass therethrough, and a photo-sensor 1306. The photo-sensor 1306 obtains the image of the sensing area via the IR filter device 1304, and is coupled to the processor or the sub-processor. Furthermore, the IR illumination device 1302 may be an IR light-emitting diode (IR LED), and the IR filter device 1304 may be an IR-pass filter.

For persons skilled in the art, although each of the sensing systems employs three light-emitting elements in the above exemplary embodiments, each of the sensing systems may only employs two light-emitting elements to perform the present invention, which is further described in FIG. 6. Referring to FIG. 6, the bright zone of the image-sensing window of the image sensor 612 is mainly generated by the light emitted from the light-emitting element 606 and the light reflected by the reflective mirror 604. The bright zone of the image-sensing window of the image sensor 614 is mainly generated by the light emitted from the light-emitting element 610 and the light reflected by the reflective mirror 604. Therefore, the light-emitting element 608 can be replaced by a non-light-emitting element, such as a common light-reflecting element. In addition, from the above description it can be seen that all of the light-emitting elements 606, 608 and 610 or only the light-emitting elements 606 and 610 as shown in FIG. 6 can be replaced by the light-reflecting elements, as long as the replaced light-reflecting elements can reflect the light to the sensing area 618 and does not generate the mirror image of the sensing area 618. It is noted that each of the replaced light-reflecting elements has a face facing the sensing area, and the face has a reflective material, e.g., a retro-reflective material.

In addition, although the sensing ranges of the image sensors 612 and 614 cover all of the sensing area 618 respectively in the above exemplary embodiments, it is obvious for persons skilled in the art that the present invention can also be implemented by using two image sensors and only one of the two image sensors has a sensing range covering all of the sensing area. That is, the two image sensors may be differentiated into a main image sensor and an auxiliary image sensor, only the main image sensor has the sensing range covering all of the sensing area, and the auxiliary image sensor has the sensing range covering an sub-area where the main image sensor is easy to sense a single obscure line in the sensing area. Thus, the present invention can also be implemented. In addition, although the sensing area 618 is rectangular in the above exemplary embodiments, it is obvious for persons skilled in the art that the sensing area 618 is not limited to be rectangular, and the sensing area 618 may be other-shaped, such as trapezoidal.

Figure 14:
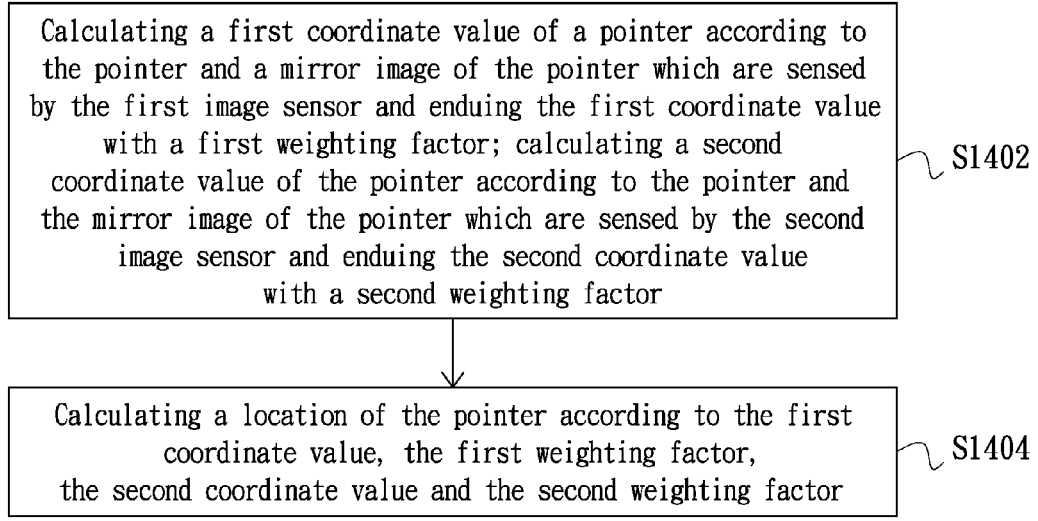
FIG. 14 illustrates a method for obtaining a location of a pointer in accordance with an exemplary embodiment of the present invention, which is adapted for a sensing system.

Two basic operating flows can be generalized from the above exemplary embodiments and the above description, and one thereof is described in FIG. 14. FIG. 14 illustrates a method for obtaining a location of a pointer in accordance with an exemplary embodiment of the present invention, which is adapted for a sensing system. The sensing system includes a sensing area, a reflective mirror, a first image sensor and a second image sensor. The reflective mirror is configured for generating a mirror image of the sensing area. The first image sensor and the second image sensor are both configured for sensing images of the sensing area, and at least one of the two image sensors has a sensing range covering all of the sensing area. The method includes following steps: firstly, calculating a first coordinate value according to a pointer and a mirror image of the pointer which are sensed by the first image sensor and enduing the first coordinate value with a first weighting factor; and calculating a second coordinate value according to the pointer and the mirror image of the pointer which are sensed by the second image sensor and enduing the second coordinate value with a second weighting factor (as shown in a step S1402); next, calculating the location of the pointer according to the first coordinate value, the first weighting factor, the second coordinate value and the second weighting factor (as shown in a step S1404).

Figure 15:
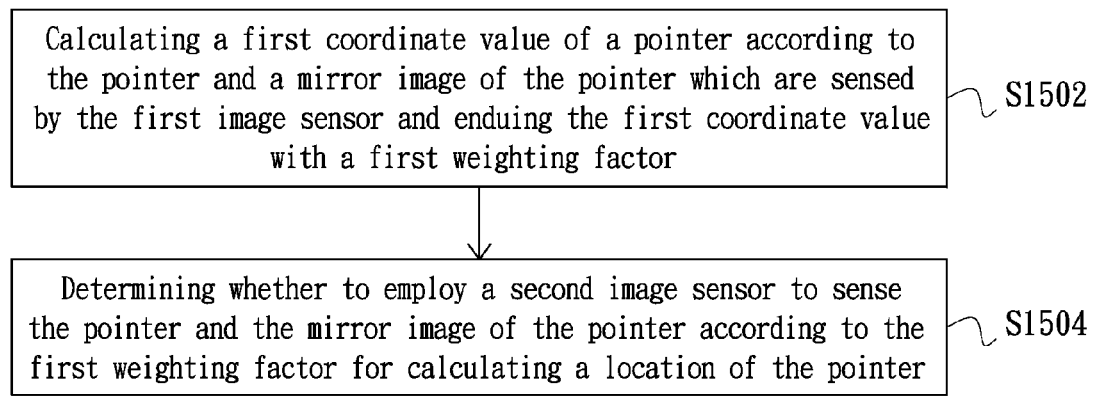
FIG. 15 illustrates a method for obtaining a location of a pointer in accordance with another exemplary embodiment of the present invention, which is adapted for a sensing system.

FIG. 15 illustrates a method for obtaining a location of a pointer in accordance with another exemplary embodiment of the present invention, which is adapted for a sensing system. The sensing system includes a sensing area, a reflective mirror, a first image sensor and a second image sensor. The reflective mirror is configured for generating a mirror image of the sensing area. The first image sensor and the second image sensor are both configured for sensing images of the sensing area, and at least one of the two image sensors has a sensing range covering all of the sensing area. The method includes following steps: firstly, calculating a first coordinate value according to a pointer and a mirror image of the pointer which are sensed by the first image sensor and enduing the first coordinate value with a first weighting factor (as shown in a step S1502); next, determining whether to employ the second image sensor to sense the pointer and the mirror image of the pointer according to the first weighting factor for calculating the location of the pointer (as shown in a step S1504).

It should be noted that calculating the location of the pointer may employ various different method and is not limited to be a method disclosed in a Taiwan patent application numbered 097126033. The following will describe another method for calculating the location of the pointer. However, since an operating principle of enabling the processor to utilize the images sensed by the image sensor for calculating the location of the pointer is disclosed in the above Taiwan patent application, the following will describe relative mathematical algorithms of the above method.

Figure 16:
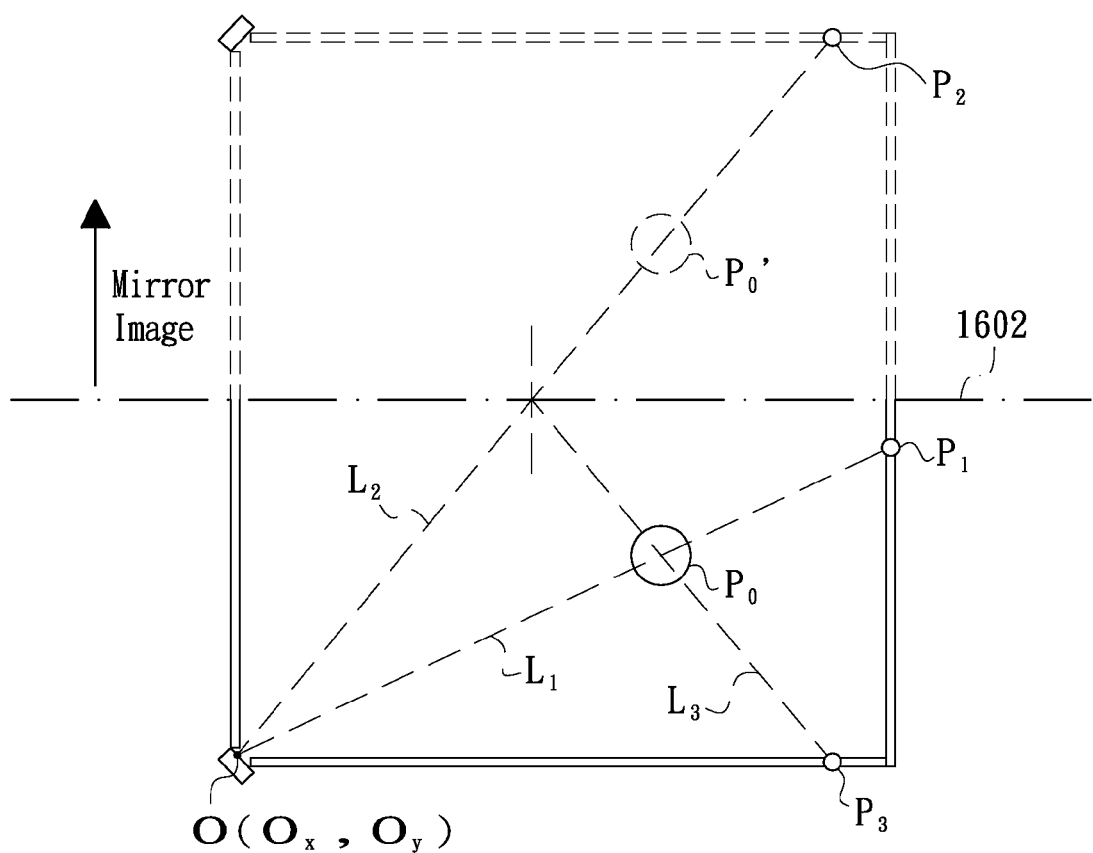
FIG. 16 is a schematic view for calculating the location of the pointer.

FIG. 16 is a schematic view of calculating the location of the pointer. As shown in FIG. 16, a portion below a broken line 1602 is a part of an entity of the sensing system, and a portion above the broken line 1602 is a mirror image of the part of the entity of the sensing system. In FIG. 16, coordinate values of a dot O, a dot $P_0$, a dot $P_1$, a dot $P_2$ and a dot $P_3$ and linear equations of a line $L_1$, a line $L_2$ and a line $L_3$ are represented respectively by following formulas:

$$O:(o_x, o_y)$$

$$P_0:(x_0, y_0)$$

$$P_1:(x_1, y_1)$$

$$P_2:(x_2, y_2)$$

$$P_3:(x_3, y_3)$$

$$L_1: y = m_1 x + b_1$$

$$L_2: y = m_2 x + b_2$$

$$L_3: y = m_3 x + b_3$$

Furthermore, the above $m_1$, $m_2$, $m_3$, $b_1$, $b_2$ and $b_3$ can be represented respectively by following formulas:

$$m_1 = \frac{y_1 - o_y}{x_1 - o_x}$$

$$m_2 = \frac{y_2 - o_y}{x_2 - o_x}$$

$$m_3 = -m_2$$

$$b_1 = y_1 - m_1 x_1$$

$$b_2 = y_2 - m_2 x_2$$

$$b_3 = y_3 - m_3 x_3$$

Therefore, $x_0$ and $y_0$ of the dot $P_0$ can be represented respectively by following formulas:

$$x_0 = \frac{b_3 - b_1}{m_1 - m_3}$$

$$y_0 = m_3 x_0 + b_3$$

In summary, in the present invention the two image sensors are disposed at two different corners of the sensing area respectively, and the images obtained by the two image sensors are utilized to calculate two coordinate values of the pointer. After obtaining the two coordinate values, the two coordinate values are endued with two different weighting factors respectively in relation to the disposed locations of the image sensors, so as to evaluate important degrees (that is accurate degrees) of the two coordinate values. Therefore, if properly enduing with the weighting factors, the location of the pointer can be calculated and can be accurately calculated no matter where the pointer is disposed in the sensing area. Furthermore, in the present invention an image obtained by an image sensor could be utilized to calculate a coordinate value of the pointer firstly, and then the coordinate value is endued with a weighting factor in relation to the disposed location of the image sensor, so as to evaluate an important degree (that is an accurate degree) of the coordinate value for determining whether to employ another image sensor to obtain another image, such that another coordinate value with a more accurate degree can be calculated. Similarly, if properly enduing with the weighting factor, the location of the pointer can be calculated and can be accurately calculated no matter where the pointer is disposed in the sensing area.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sensing system, comprising:
a sensing area;
a reflective mirror configured for generating mirror images of the sensing area;
a first image sensor;
a second image sensor, the second image sensor and the first image sensor being both configured for sensing images of the sensing area, and at least one of the first image sensor and the second image sensor having a sensing range covering all of the sensing area;
at least one light-emitting element, disposed on a boundary of the sensing area for emitting light towards the sensing area, the said at least one light-emitting element being mirrored by the reflective mirror so as to generate the mirror images corresponding to the said at least one light-emitting element; and
a processor, wherein when a pointer approaches the sensing area, the processor calculates a first coordinate value of the pointer according to the pointer and a mirror image of the pointer which are sensed by the first image sensor and endues the first coordinate value with a first weighting factor, and the processor also calculates a second coordinate value of the pointer according to the pointer and the mirror image of the pointer which are sensed by the second image sensor and endues the second coordinate value with a second weighting factor, such that the processor could calculate the location of the pointer according to the first coordinate value, the first weighting factor, the second coordinate value and the second weighting factor.

2. The sensing system as claimed in claim 1, wherein the processor regards the sensing area as a first area and divides the first area into a plurality of sub-areas to endue each of the sub-areas with a weighting factor in relation to the first image sensor, after the processor calculates the first coordinate value, the processor designates a weighting factor of a sub-area of the first area where the pointer is located as the first weighting factor; the processor regards the sensing area as a second area and divides the second area into a plurality of sub-areas to endue each of the sub-areas with a weighting factor in relation to the second image sensor, after the processor calculates the second coordinate value, the processor designates a weighting factor of a sub-area of the first area where the pointer is located as the second weighting factor.

3. The sensing system as claimed in claim 1, wherein the processor comprises:
a first sub-processor configured for calculating the first coordinate value according to the pointer and the mirror image of the pointer which are sensed by the first image sensor and enduing the first coordinate value with the first weighting factor;
a second sub-processor configured for calculating the second coordinate value according to the pointer and the mirror image of the pointer which are sensed by the second image sensor and enduing the second coordinate value with the second weighting factor; and
a third sub-processor configured for calculating the location of the pointer according to the first coordinate value, the first weighting factor, the second coordinate value and the second weighting factor.

4. The sensing system as claimed in claim 3, wherein the first sub-processor regards the sensing area as a first area and divides the first area into a plurality of sub-areas to endue each of the sub-areas with a weighting factor in relation to the first image sensor, after the first sub-processor calculates the first coordinate value, the first sub-processor designates a weighting factor of a sub-area of the first area where the pointer is located as the first weighting factor; the second sub-processor regards the sensing area as a second area and divides the second area into a plurality of sub-areas to endue each of the sub-areas with a weighting factor in relation to the second image sensor, after the second sub-processor calculates the second coordinate value, the second sub-processor designates a weighting factor of a sub-area of the second area where the pointer is located as the second weighting factor.

5. The sensing system as claimed in claim 1, wherein the sensing area is quadrangular and has a first boundary, a second boundary, a third boundary and a fourth boundary which are connected in order, the reflective mirror is disposed on the first boundary, the first image sensor is disposed at a corner at which the third boundary and the fourth boundary intersect, and the second image sensor is disposed at a corner at which the second boundary and the third boundary intersect.

6. The sensing system as claimed in claim 5, further comprising a first light-emitting element and a second light-emitting element, wherein the first light-emitting element and the second light-emitting element are disposed on the fourth boundary and the second boundary respectively and are configured for emitting light towards the sensing area, and the first light-emitting element and the second light-emitting element are mirrored by the reflective mirror so as to generate mirror images corresponding to the two light-emitting elements.

7. The sensing system as claimed in claim 5, further comprising a first light-reflecting element and a second light-reflecting element, wherein the first light-reflecting element and the second light-reflecting element are disposed on the fourth boundary and the second boundary respectively, and are configured for reflecting light towards the sensing area and not generating mirror images of the sensing area, and the first light-reflecting element and the second light-reflecting element are mirrored by the reflective mirror so as to generate mirror images corresponding to the two light-emitting elements.

8. The sensing system as claimed in claim 7, wherein each of the first light-reflecting element and the second light-reflecting element has a face facing the sensing area, the face has a reflective material, and the reflective material is a retro-reflective material.

9. The sensing system as claimed in claim 1, wherein each of the first image sensor and the second image sensor comprises an infrared illumination device.

10. The sensing system as claimed in claim 8, wherein the infrared illumination device comprises an infrared light-emitting diode.

11. The sensing system as claimed in claim 8, wherein each of the first image sensor and the second image sensor further comprises an infrared filter device configured for only allowing infrared light to pass therethrough, and each of the first image sensor and the second image sensor obtains the image of the sensing area via the infrared filter device.

12. A sensing system, comprising:
a sensing area;
a reflective mirror configured for generating mirror images of the sensing area;
at least one light-emitting element, disposed on a boundary of the sensing area for emitting light towards the sensing area, the said at least one light-emitting element being mirrored by the reflective mirror so as to generate the mirror images corresponding to the said at least one light-emitting element;
a first image sensor;
a second image sensor, the second image sensor and the first image sensor being both configured for sensing images of the sensing area, and at least one of the first image sensor and the second image sensor having a sensing range covering all of the sensing area;
a first processor, wherein when a pointer approaches the sensing area, the first processor calculates a first coordinate value of the pointer according to the pointer and a mirror image of the pointer which are sensed by the first image sensor and endues the first coordinate value with a first weighting factor; and
a second processor configured for receiving the first coordinate value and the first weighting factor, and determining whether to employ the second image sensor to sense the pointer and the mirror image of the pointer according to the first weighting factor for calculating the location of the pointer.

13. The sensing system as claimed in claim 12, wherein when the second processor determines to employ the second image sensor, the second processor calculates a second coordinate value of the pointer according to the pointer and the mirror image of the pointer which are sensed by the second image sensor and endues the second coordinate value with a second weighting factor, such that the second processor could calculate the location of the pointer according to the first coordinate value, the first weighting factor, the second coordinate value and the second weighting factor.

14. The sensing system as claimed in claim 13, wherein the first processor regards the sensing area as a first area and divides the first area into a plurality of sub-areas to endue each of the sub-areas with a weighting factor in relation to the first image sensor, after the first processor calculates the first coordinate value, the first processor designates a weighting factor of a sub-area of the first area where the pointer is located as the first weighting factor; the second processor regards the sensing area as a second area and divides the second area into a plurality of sub-areas to endue each of the sub-areas with a weighting factor in relation to the second image sensor, after the second processor calculates the second coordinate value, the second processor designates a weighting factor of a sub-area of the second area where the pointer is located as the second weighting factor.

15. The sensing system as claimed in claim 12, wherein when the second processor determines to employ the second image sensor, the second processor calculates a second coordinate value of the pointer according to the pointer and the mirror image of the pointer which are sensed by the second image sensor, and regards the second coordinate value as the location of the pointer.

16. The sensing system as claimed in claim 15, wherein the first processor regards the sensing area as a first area and divides the first area into a plurality of sub-areas to endue each of the sub-areas with a weighting factor in relation to the first image sensor, after the first processor calculates the first coordinate value, the first processor designates a weighting factor of a sub-area of the first area where the pointer is located as the first weighting factor.

17. The sensing system as claimed in claim 12, wherein when the second processor determines not to employ the second image sensor, the second processor regards the first coordinate value as the location of the pointer.

18. The sensing system as claimed in claim 17, wherein the first processor regards the sensing area as a first area and divides the first area into a plurality of sub-areas to endue each of the sub-areas with a weighting factor in relation to the first image sensor, after the first processor calculates the first coordinate value, the first processor regards a weighting factor of a sub-area of the first area where the pointer is located as the first weighting factor.

19. The sensing system as claimed in claim 12, wherein the sensing area is quadrangular and has a first boundary, a second boundary, a third boundary and a fourth boundary which are connected in order, the reflective mirror is disposed on the first boundary, the first image sensor is disposed at a corner at which the third boundary and the fourth boundary intersect, and the second image sensor is disposed at a corner at which the second boundary and the third boundary intersect.

20. The sensing system as claimed in claim 19, further comprising a first light-emitting element and a second light-emitting element, wherein the first light-emitting element and the second light-emitting element are disposed on the fourth boundary and the second boundary respectively and are configured for emitting light towards the sensing area, and the first light-emitting element and the second light-emitting element are mirrored by the reflective mirror so as to generate mirror images corresponding to the two light-emitting elements.

21. The sensing system as claimed in claim 19, further comprising a first light-reflecting element and a second light-reflecting element, wherein the first light-reflecting element and the second light-reflecting element are disposed on the fourth boundary and the second boundary respectively, and are configured for reflecting light towards the sensing area and not generating mirror images of the sensing area, and the first light-reflecting element and the second light-reflecting element are mirrored by the reflective mirror so as to generate mirror images corresponding to the two light-emitting elements.

22. The sensing system as claimed in claim 21, wherein each of the first light-reflecting element and the second light-reflecting element has a face facing the sensing area, the face has a reflective material, and the reflective material is a retro-reflective material.

23. The sensing system as claimed in claim 12, wherein each of the first image sensor and the second image sensor comprises an infrared illumination device.

24. The sensing system as claimed in claim 23, wherein the infrared illumination device comprises an infrared light-emitting diode.

25. The sensing system as claimed in claim 23, wherein each of the first image sensor and the second image sensor further comprises an infrared filter device configured for only allowing infrared light to pass therethrough, and each of the first image sensor and the second image sensor obtains an image of the sensing area via the infrared filter device.

26. A method for obtaining a location of a pointer, the method being adapted for a sensing system, the sensing system comprising a sensing area, a reflective mirror, a first image sensor and a second image sensor, the reflective mirror being configured for generating a mirror image of the sensing area, the first image sensor and the second image sensor being both configured for sensing images of the sensing area, and at least one of the first image sensor and the second image sensor having a sensing range covering all of the sensing area, the method comprising:
calculating a first coordinate value of the pointer according to the pointer and a mirror image of the pointer which are sensed by the first image sensor and enduing the first coordinate value with a first weighting factor;
calculating a second coordinate value of the pointer according to the pointer and the mirror image of the pointer which are sensed by the second image sensor and enduing the second coordinate value with a second weighting factor; and
calculating the location of the pointer according to the first coordinate value, the first weighting factor, the second coordinate value and the second weighting factor.

27. The method as claimed in claim 26, wherein the steps of generating the first weighting factor in the method comprises to regard the sensing area as a first area, to divide the first area into a plurality of sub-areas to endue each of the sub-areas with a weighting factor in relation to the first image sensor, to designate a weighting factor of a sub-area of the first area where the pointer is located as the first weighting factor after calculating the first coordinate value; the steps of generating the second weighting factor in the method comprises to regard the sensing area as a second area, to divide the second area into a plurality of sub-areas to endue each of the sub-areas with a weighting factor in relation to the second image sensor, to designate a weighting factor of a sub-area of the second area where the pointer is located as the second weighting factor after calculating the second coordinate value.

28. A method for obtaining a location of a pointer, the method being adapted for a sensing system, the sensing system comprising a sensing area, a reflective mirror, a first image sensor and a second image sensor, the reflective mirror being configured for generating a mirror image of the sensing area, the first image sensor and the second image sensor being both configured for sensing images of the sensing area, and at least one of the first image sensor and the second image sensor having a sensing range covering all of the sensing area, the method comprising:
calculating a first coordinate value of the pointer according to the pointer and a mirror image of the pointer which are sensed by the first image sensor and enduing the first coordinate value with a first weighting factor; and
determining whether to employ the second image sensor to sense the pointer and the mirror image of the pointer according to the first weighting factor for calculating the location of the pointer.

29. The method as claimed in claim 28, wherein when determining to employ the second image sensor, a second coordinate value of the pointer is calculated according to the pointer and the mirror image of the pointer which are sensed by the second image sensor and the second coordinate value is endued with a second weighting factor, such that the location of the pointer could be calculated according to the first coordinate value, the first weighting factor, the second coordinate value and the second weighting factor.

30. The method as claimed in claim 29, wherein the steps of generating the first weighting factor in the method comprises to regard the sensing area as a first area, to divide the first area into a plurality of sub-areas to endue each of the sub-areas with a weighting factor in relation to the first image sensor, to designate a weighting factor of a sub-area of the first area where the pointer is located as the first weighting factor after calculating the first coordinate value; the steps of generating the second weighting factor in the method comprises to regard the sensing area as a second area, to divide the second area into a plurality of sub-areas to endue each of the sub-areas with a weighting factor in relation to the second image sensor, to designate a weighting factor of a sub-area of the second area where the pointer is located as the second weighting factor after calculating the second coordinate value.

31. The method as claimed in claim 28, wherein when determining to employ the second image sensor, a second coordinate value of the pointer is calculated according to the pointer and the mirror image of the pointer which are sensed by the second image sensor, and the second coordinate value is regarded as the location of the pointer.

32. The method as claimed in claim 31, wherein the steps of generating the first weighting factor in the method comprises to regard the sensing area as a first area, to divide the first area into a plurality of sub-areas to endue each of the sub-areas with a weighting factor in relation to the first image sensor, to designate a weighting value of a sub-area of the first area where the pointer is located as the first weighting factor after calculating the first coordinate value.

33. The method as claimed in claim 28, wherein when determining not to employ the second image sensor, the first coordinate value is regarded as the location of the pointer.

34. The method as claimed in claim 33, wherein the steps of generating the first weighting factor in the method comprises to regard the sensing area as a first area, to divide the first area into a plurality of sub-areas to endue each of the sub-areas with a weighting factor in relation to the first image sensor, to designate a weighting factor of a sub-area of the first area where the pointer is located as the first weighting factor after calculating the first coordinate value.

35. A sensing system, comprising:
a sensing area;
a reflective mirror configured for generating mirror images of the sensing area;
a first image sensor;
a second image sensor, the second image sensor and the first image sensor being both configured for sensing images of the sensing area, and at least one of the first image sensor and the second image sensor having a sensing range covering all of the sensing area, wherein each of the first image sensor and the second image sensor comprises an infrared illumination device; and
a processor, wherein when a pointer approaches the sensing area, the processor calculates a first coordinate value of the pointer according to the pointer and a mirror image of the pointer which are sensed by the first image sensor and endues the first coordinate value with a first weighting factor, and the processor also calculates a second coordinate value of the pointer according to the pointer and the mirror image of the pointer which are sensed by the second image sensor and endues the second coordinate value with a second weighting factor, such that the processor could calculate the location of the pointer according to the first coordinate value, the first weighting factor, the second coordinate value and the second weighting factor.

36. The sensing system as claimed in claim 35, wherein the processor regards the sensing area as a first area and divides the first area into a plurality of sub-areas to endue each of the sub-areas with a weighting factor in relation to the first image sensor, after the processor calculates the first coordinate value, the processor designates a weighting factor of a sub-area of the first area where the pointer is located as the first weighting factor; the processor regards the sensing area as a second area and divides the second area into a plurality of sub-areas to endue each of the sub-areas with a weighting factor in relation to the second image sensor, after the processor calculates the second coordinate value, the processor designates a weighting factor of a sub-area of the first area where the pointer is located as the second weighting factor.

37. The sensing system as claimed in claim 35, wherein the processor comprises:
   a first sub-processor configured for calculating the first coordinate value according to the pointer and the mirror image of the pointer which are sensed by the first image sensor and enduing the first coordinate value with the first weighting factor;
   a second sub-processor configured for calculating the second coordinate value according to the pointer and the mirror image of the pointer which are sensed by the second image sensor and enduing the second coordinate value with the second weighting factor; and
   a third sub-processor configured for calculating the location of the pointer according to the first coordinate value, the first weighting factor, the second coordinate value and the second weighting factor.

38. The sensing system as claimed in claim 37, wherein the first sub-processor regards the sensing area as a first area and divides the first area into a plurality of sub-areas to endue each of the sub-areas with a weighting factor in relation to the first image sensor, after the first sub-processor calculates the first coordinate value, the first sub-processor designates a weighting factor of a sub-area of the first area where the pointer is located as the first weighting factor; the second sub-processor regards the sensing area as a second area and divides the second area into a plurality of sub-areas to endue each of the sub-areas with a weighting factor in relation to the second image sensor, after the second sub-processor calculates the second coordinate value, the second sub-processor designates a weighting factor of a sub-area of the second area where the pointer is located as the second weighting factor.

39. The sensing system as claimed in claim 35, wherein the sensing area is quadrangular and has a first boundary, a second boundary, a third boundary and a fourth boundary which are connected in order, the reflective mirror is disposed on the first boundary, the first image sensor is disposed at a corner at which the third boundary and the fourth boundary intersect, and the second image sensor is disposed at a corner at which the second boundary and the third boundary intersect.

40. The sensing system as claimed in claim 39, further comprising a first light-emitting element and a second light-emitting element, wherein the first light-emitting element and the second light-emitting element are disposed on the fourth boundary and the second boundary respectively and are configured for emitting light towards the sensing area, and the first light-emitting element and the second light-emitting element are mirrored by the reflective mirror so as to generate mirror images corresponding to the two light-emitting elements.

41. The sensing system as claimed in claim 39, further comprising a first light-reflecting element and a second light-reflecting element, wherein the first light-reflecting element and the second light-reflecting element are disposed on the fourth boundary and the second boundary respectively, and are configured for reflecting light towards the sensing area and not generating mirror images of the sensing area, and the first light-reflecting element and the second light-reflecting element are mirrored by the reflective mirror so as to generate mirror images corresponding to the two light-emitting elements.

42. The sensing system as claimed in claim 41, wherein each of the first light-reflecting element and the second light-reflecting element has a face facing the sensing area, the face has a reflective material, and the reflective material is a retro-reflective material.

43. The sensing system as claimed in claim 35, wherein the infrared illumination device comprises an infrared light-emitting diode.

44. The sensing system as claimed in claim 35, wherein each of the first image sensor and the second image sensor further comprises an infrared filter device configured for only allowing infrared light to pass therethrough, and each of the first image sensor and the second image sensor obtains the image of the sensing area via the infrared filter device.

45. A sensing system, comprising:
   a sensing area;
   a reflective mirror configured for generating mirror images of the sensing area;
   a first image sensor;
   a second image sensor, the second image sensor and the first image sensor being both configured for sensing images of the sensing area, and at least one of the first image sensor and the second image sensor having a sensing range covering all of the sensing area, wherein each of the first image sensor and the second image sensor comprises an infrared illumination device;
   a first processor, wherein when a pointer approaches the sensing area, the first processor calculates a first coordinate value of the pointer according to the pointer and a mirror image of the pointer which are sensed by the first image sensor and endues the first coordinate value with a first weighting factor; and
   a second processor configured for receiving the first coordinate value and the first weighting factor, and determining whether to employ the second image sensor to sense the pointer and the mirror image of the pointer according to the first weighting factor for calculating the location of the pointer.

46. The sensing system as claimed in claim 45, wherein when the second processor determines to employ the second image sensor, the second processor calculates a second coordinate value of the pointer according to the pointer and the mirror image of the pointer which are sensed by the second image sensor and endues the second coordinate value with a second weighting factor, such that the second processor could calculate the location of the pointer according to the first coordinate value, the first weighting factor, the second coordinate value and the second weighting factor.

47. The sensing system as claimed in claim 46, wherein the first processor regards the sensing area as a first area and divides the first area into a plurality of sub-areas to endue each of the sub-areas with a weighting factor in relation to the first image sensor, after the first processor calculates the first coordinate value, the first processor designates a weighting factor of a sub-area of the first area where the pointer is located as the first weighting factor; the second processor regards the sensing area as a second area and divides the second area into a plurality of sub-areas to endue each of the sub-areas with a weighting factor in relation to the second image sensor, after the second processor calculates the second coordinate value, the second processor designates a weighting factor of a sub-area of the second area where the pointer is located as the second weighting factor.

48. The sensing system as claimed in claim 45, wherein when the second processor determines to employ the second image sensor, the second processor calculates a second coordinate value of the pointer according to the pointer and the mirror image of the pointer which are sensed by the second image sensor, and regards the second coordinate value as the location of the pointer.

49. The sensing system as claimed in claim 48, wherein the first processor regards the sensing area as a first area and divides the first area into a plurality of sub-areas to endue each of the sub-areas with a weighting factor in relation to the first image sensor, after the first processor calculates the first coordinate value, the first processor designates a weighting factor of a sub-area of the first area where the pointer is located as the first weighting factor.

50. The sensing system as claimed in claim 45, wherein when the second processor determines not to employ the second image sensor, the second processor regards the first coordinate value as the location of the pointer.

51. The sensing system as claimed in claim 50, wherein the first processor regards the sensing area as a first area and divides the first area into a plurality of sub-areas to endue each of the sub-areas with a weighting factor in relation to the first image sensor, after the first processor calculates the first coordinate value, the first processor regards a weighting factor of a sub-area of the first area where the pointer is located as the first weighting factor.

52. The sensing system as claimed in claim 45, wherein the sensing area is quadrangular and has a first boundary, a second boundary, a third boundary and a fourth boundary which are connected in order, the reflective mirror is disposed on the first boundary, the first image sensor is disposed at a corner at which the third boundary and the fourth boundary intersect, and the second image sensor is disposed at a corner at which the second boundary and the third boundary intersect.

53. The sensing system as claimed in claim 52, further comprising a first light-emitting element and a second light-emitting element, wherein the first light-emitting element and the second light-emitting element are disposed on the fourth boundary and the second boundary respectively and are configured for emitting light towards the sensing area, and the first light-emitting element and the second light-emitting element are mirrored by the reflective mirror so as to generate mirror images corresponding to the two light-emitting elements.

54. The sensing system as claimed in claim 52, further comprising a first light-reflecting element and a second light-reflecting element, wherein the first light-reflecting element and the second light-reflecting element are disposed on the fourth boundary and the second boundary respectively, and are configured for reflecting light towards the sensing area and not generating mirror images of the sensing area, and the first light-reflecting element and the second light-reflecting element are mirrored by the reflective mirror so as to generate mirror images corresponding to the two light-emitting elements.

55. The sensing system as claimed in claim 54, wherein each of the first light-reflecting element and the second light-reflecting element has a face facing the sensing area, the face has a reflective material, and the reflective material is a retro-reflective material.

56. The sensing system as claimed in claim 45, wherein the infrared illumination device comprises an infrared light-emitting diode.

57. The sensing system as claimed in claim 45, wherein each of the first image sensor and the second image sensor further comprises an infrared filter device configured for only allowing infrared light to pass therethrough, and each of the first image sensor and the second image sensor obtains an image of the sensing area via the infrared filter device.

* * * * *